(12) United States Patent
Li et al.

(10) Patent No.: US 10,004,270 B2
(45) Date of Patent: *Jun. 26, 2018

(54) HEATING ASSEMBLY, ATOMIZER AND ELECTRONIC CIGARETTE HAVING SAME

(71) Applicant: Shenzhen First Union Technology Co., Ltd., Shenzhen (CN)

(72) Inventors: Yonghai Li, Shenzhen (CN); Zhongli Xu, Shenzhen (CN); Shuyun Hu, Shenzhen (CN)

(73) Assignee: SHENZHEN FIRST UNION TECHNOLOGY CO., LTD., Shenzhen, Guangdong Province (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/370,822

(22) Filed: Dec. 6, 2016

(65) Prior Publication Data

US 2017/0079332 A1    Mar. 23, 2017

(30) Foreign Application Priority Data

Dec. 14, 2015   (CN) .......................... 2015 1 0923184

(51) Int. Cl.
| | |
|---|---|
| A24F 13/00 | (2006.01) |
| A24F 47/00 | (2006.01) |
| G01K 7/22 | (2006.01) |
| H05B 3/26 | (2006.01) |

(52) U.S. Cl.
CPC .............. *A24F 47/008* (2013.01); *G01K 7/22* (2013.01); *H05B 3/265* (2013.01); *H05B 2203/003* (2013.01); *H05B 2203/013* (2013.01)

(58) Field of Classification Search
CPC ..... A24F 47/008; H05B 1/0244; H05B 3/265; H05B 2203/021; H05B 2203/03; G01K 7/22
USPC .................................................. 131/329, 328
See application file for complete search history.

(56) References Cited

U.S. PATENT DOCUMENTS

| | | | | |
|---|---|---|---|---|
| 6,720,710 | B1 * | 4/2004 | Wenzel | B01L 3/50273 310/328 |
| 7,753,686 | B2 * | 7/2010 | Kim | H01R 11/12 224/675 |
| 2016/0021930 | A1 * | 1/2016 | Minskoff | A61M 15/06 131/329 |
| 2016/0198771 | A1 * | 7/2016 | Goggin | A24F 47/008 131/329 |
| 2017/0105454 | A1 * | 4/2017 | Li | A24F 47/008 |

* cited by examiner

*Primary Examiner* — Khiem Nguyen
(74) *Attorney, Agent, or Firm* — Cheng-Ju Chiang

(57) ABSTRACT

An exemplary heating assembly includes a ceramic substrate having at least one surface, a heating element formed on the at least one surface, and a temperature sensing element formed on the at least one surface. The heating element includes a heating part and an electrode part. The heating part is formed on the at least one surface, and the electrode part is arranged at two opposite ends of the heating part. The temperature sensing element includes a thermistor layer and an electrically connecting part. The thermistor layer is formed on the at least one surface. The electrically connecting part connects the thermistor layer, and the thermistor layer is insulated from the heating part.

13 Claims, 6 Drawing Sheets

HEATING ASSEMBLY, ATOMIZER AND ELECTRONIC CIGARETTE HAVING SAME

TECHNICAL FIELD

The present invention relates to electronic cigarettes, and particularly to a heating assembly, an atomizer and an electronic cigarette using same.

BACKGROUND ART

A typical electronic cigarette includes a heating body and a temperature sensing element. The temperature sensing element is configured for sensing an atomization temperature of tobacco liquid during smoking. Generally, the heating body and the temperature sensing element are assembled individually. A position of the temperature sensing element will affect accuracy of temperature detection result. Accordingly, the temperature sensing element may not accurately detect the atomization temperature. When tobacco liquid in the electronic cigarette is used up, dry burning may occur in the electronic cigarette, thus rendering unsatisfactory.

What are needed, therefore, are a heating assembly, an atomizer and an electronic cigarette using same, which can overcome the above shortcomings.

SUMMARY

An exemplary heating assembly includes a ceramic substrate having at least one surface, a heating element formed on the at least one surface, and a temperature sensing element formed on the at least one surface. The heating element includes a heating part and an electrode part. The heating part is formed on the at least one surface, and the electrode part is arranged at two opposite ends of the heating part. The temperature sensing element includes a thermistor layer and an electrically connecting part. The thermistor layer is formed on the at least one surface. The electrically connecting part connects the thermistor layer, and the thermistor layer is insulated from the heating part.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
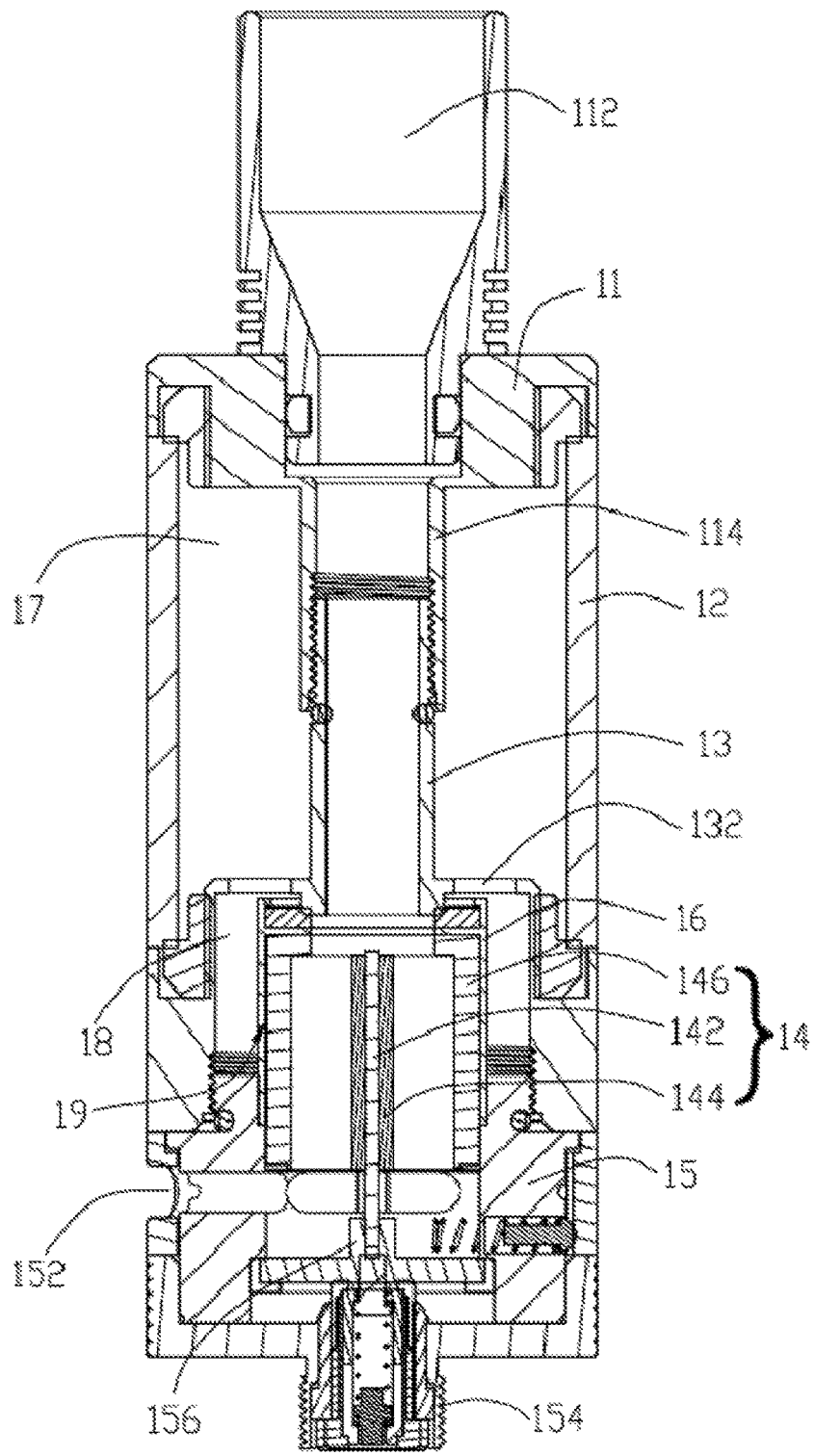
FIG. 1 is a cross-section view of an atomizer according to a first embodiment, taken along a first plane, including a heating body, an atomizing cover, a bracket, and a thermistor layer.
Figure 2:
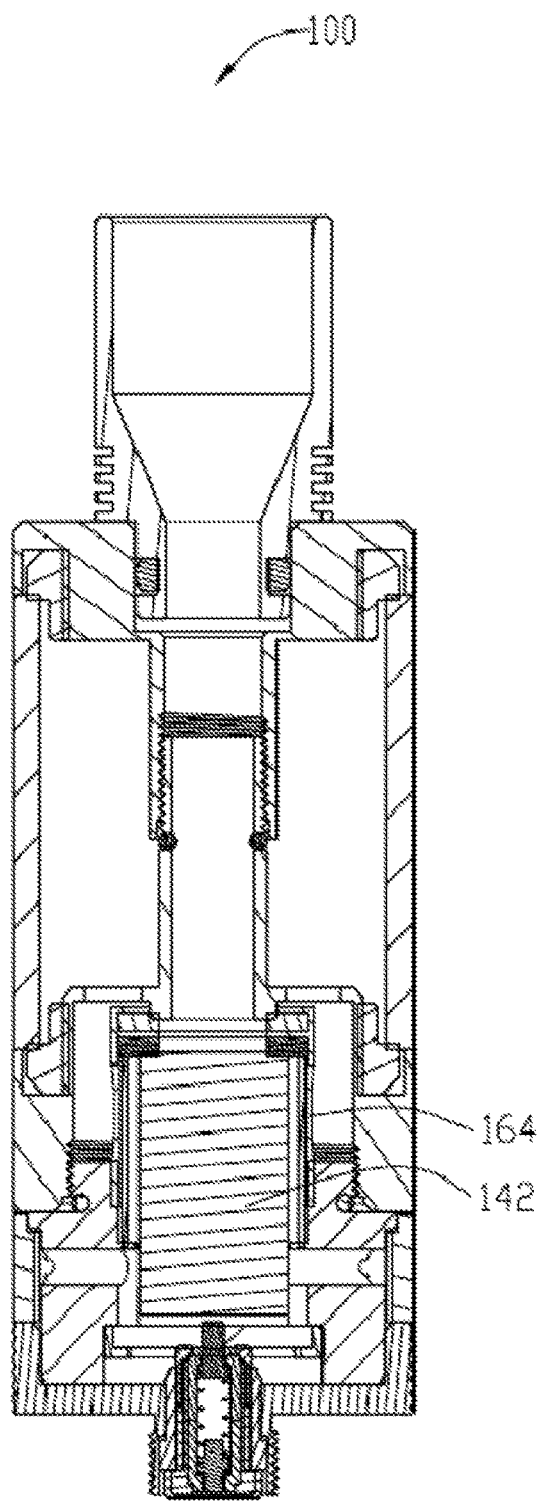
FIG. 2 is a cross-section view of the atomizer of FIG. 1, taken along a second plane substantially perpendicular to the first plane.
Figure 3:
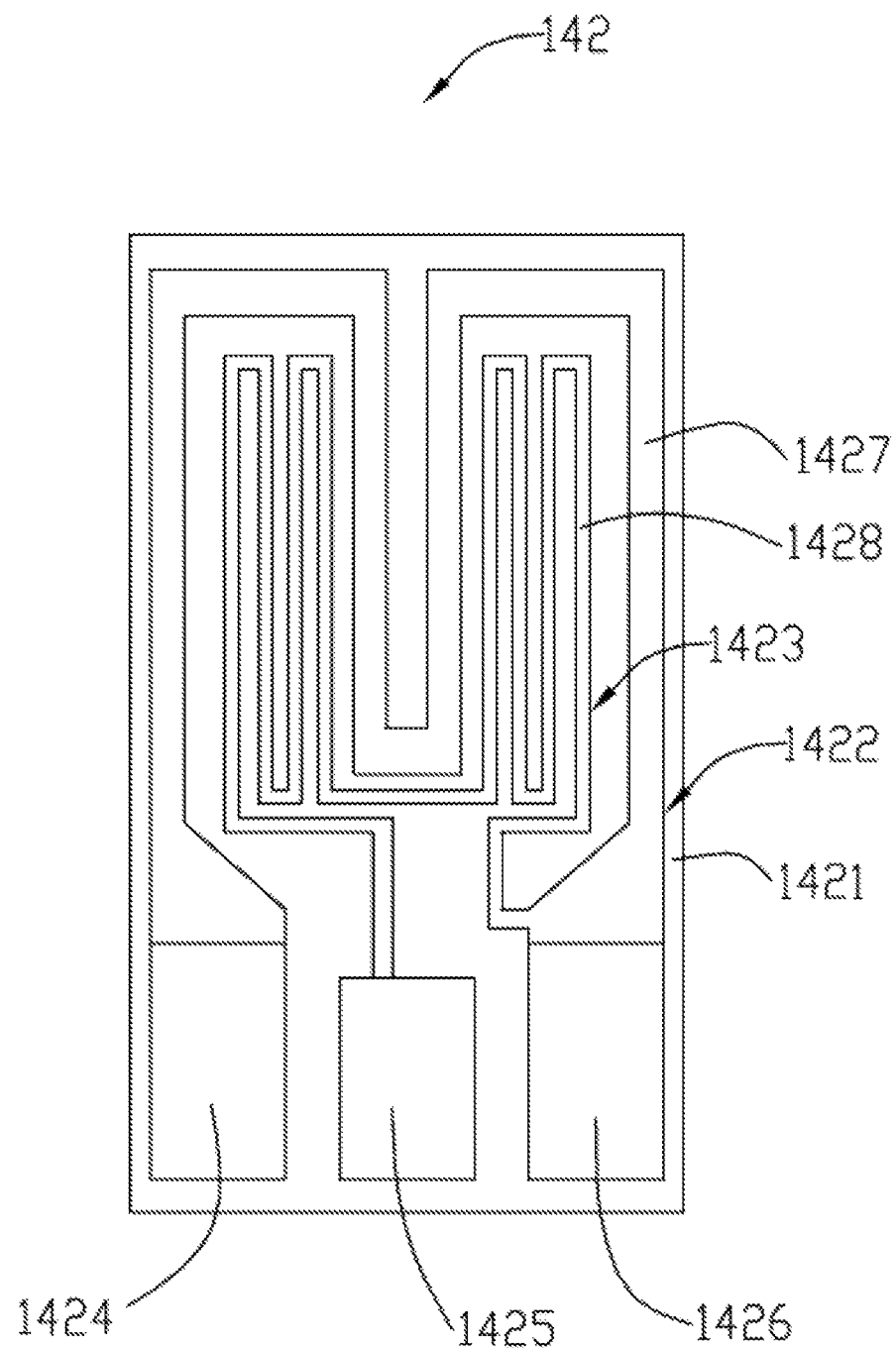
FIG. 3 is a plan view of the heating body.
Figure 4:
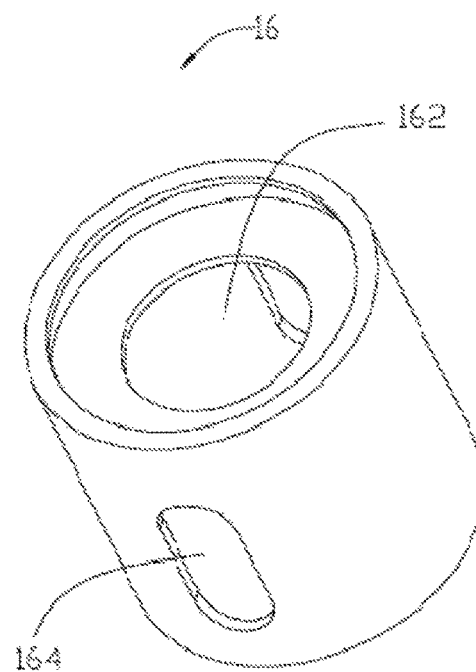
FIG. 4 is a perspective view of an atomizing cover.
Figure 5:
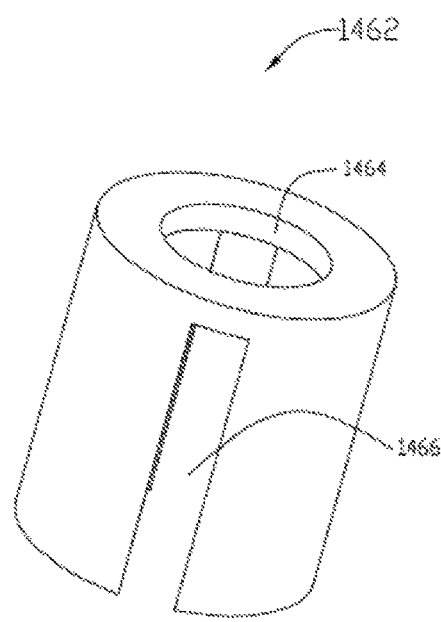
FIG. 5 is a perspective view of a bracket.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Several definitions that apply throughout this disclosure will now be presented.

The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Referring to FIGS. 1-5, an atomizer 100 includes a mouthpiece 11, a housing 12, a ventilation part 13, a heating assembly 14, a holder 15, and an atomizing cover 16.

The mouthpiece 11 is detachably connected with the housing 12, for example, via a snap-fit connection. The mouthpiece 11 defines an air outlet 112.

The mouthpiece 11 includes tubular part 114, which is detachably connected with an end of the ventilation part 13 to form an air passage. In the present embodiment, the tubular part 114 is threadedly coupled with the end of the ventilation part 13. The mouthpiece 11, the housing 12, and the ventilation part 13 cooperatively define a liquid chamber 17 for storing tobacco liquid. The mouthpiece 11 is further configured (i.e., structured and arranged) for sealing the liquid chamber 17. To inject tobacco liquid, the mouthpiece 11 is detached so that tobacco liquid can be injected via a top end of the atomizer 100. After finishing injecting tobacco liquid, the mouthpiece 11 is assembled to seal the liquid chamber 17.

The atomizing cover 16 is fixedly coupled with the ventilation part 13. The other end of the atomizing cover 16 is threadedly coupled with the holder 15. The ventilation part 13, the holder 15 and the atomizing cover 16 cooperatively define a buffer chamber 18. The ventilation part 13 defines a first liquid inlet 132, which communicates the liquid chamber 17 and the buffer chamber 18. The tobacco liquid in the liquid chamber 17 flows into the buffer chamber 18 via the first liquid inlet 132.

The atomizing cover 16 is substantially cylindrical, and the atomizing cover 16 and the holder 15 cooperatively form an atomizing chamber 19. The holder 15 defines a first air inlet 152, and the atomizing chamber 19 is in communication with the first air inlet 152. The atomizing cover 16 defines a second air outlet 162 in a top wall. The atomizing chamber 19 is in communication with the air passage via the second air outlet 162. The atomizing cover 16 defines a second liquid inlet 164 in a sidewall thereof.

The heating assembly 14 is arranged in the atomizing chamber 19. The heating assembly 14 is configured for absorbing and heating tobacco liquid. The heating assembly 14 includes a heating body 142, a liquid conducting body 144 arranged on a surface of the heating body 142, and a bracket 146. In the present embodiment, the heating body 142 is a plate including two opposite surfaces, each of which is formed with a liquid conducting body 144. The liquid conducting bodies 144 are in contact with the tobacco liquid in the buffer chamber 18, and are configured for absorbing tobacco liquid for atomization.

The heating body 142 includes a ceramic substrate 1421 having two opposite surfaces. The heating body 142 further includes a heating element 1422 and a temperature sensing element 1423 both formed on a surface of the ceramic substrate 1421. One of the two liquid conducting bodies 144 covers the heating element 1422 and the temperature sensing element 1423. The heating element 1422 includes a heating part 1427, a first electrode 1424, and a common electrode 1426. The temperature sensing element 1423 includes a thermistor layer 1428 and a second electrode 1425. The common electrode 1426 also functions as another electrode of the temperature sensing element 1423. The first electrode 1424, the second electrode 1425, and the common electrode 1426 are each in the form of a conductive contact, and are arranged in a line adjacent to a bottom edge of the ceramic substrate 1421. The heating part 1427 and the thermistor layer 1428 are made of a material consisting of tungsten, molybdenum, manganese and any combination thereof. The heating part 1427 and the thermistor layer 1428 are formed on the surface of the ceramic substrate 1421 by printing and high temperature sintering method. In this way, the heating part 1427, the thermistor layer 1428, and the ceramic substrate 1421 are formed as a whole. In the present embodiment, a resistivity of the thermistor layer 1428 is different from that of the heating part 1427 because a metal composition of the thermistor layer 1428 is different from that of the heating part 1427. Generally speaking, the resistivity of the thermistor layer 1428 is larger than that of the heating part 1427. In the present embodiment, the heating element 1422 and the temperature sensing element 1423 are formed on one surface of the ceramic substrate 1421. It is to be understood that, in other embodiments, the other surface of the ceramic substrate 1421 may also be formed with the heating element 1422 and the temperature sensing element 1423. It is noteworthy that, in other embodiments, the heating element 1422 may be formed on one surface of the ceramic substrate 1421, while the temperature sensing element 1423 may be formed on the other surface of the ceramic substrate 1421.

The liquid conducting body 144 may be made of foamed metal or cotton. The bracket 146 is substantially cylindrical, and defines two grooves 1466 in a sidewall thereof extending along a direction parallel to an axial direction. The two grooves 1466 are arranged in a radial direction in cross section. The heating body 142 and the liquid conducting body 144 are engaged in the grooves 1466. The tobacco liquid in the buffer chamber 18 permeates the liquid conducting body 144 through the second liquid inlet 164, the grooves 1466, so that the heating body 142 heats the tobacco liquid to form aerosol. The bracket 146 includes a top wall defining a third air outlet 1464. The third air outlet 1464 is in communication with the air passage, such that the aerosol formed by the heating assembly 14 can enter the air passage. The bracket 146 may be made of silicone, and can prevent the tobacco liquid in the liquid conducting body 144 from leaking.

A connection means between the heating assembly 14 and the holder 15 will be described below. The holder 15 includes a first connecting element 156 and a second connecting element 154 at two opposite sides. The first connecting element 156 is in the form of a slot, similar to a slot configured for coupling with a memory bank of a personal computer. The conductive contact of the heating body 142 is electrically engaged in the slot. The second connecting element 154 is configured for connecting with an external power supply mechanically and electrically.

It is to be understood that the ceramic substrate 1421 may be made of porous ceramic, or structural ceramic. When the ceramic substrate 1421 is made of porous ceramic, the ceramic substrate 1421 can conduct tobacco liquid, and accordingly, the liquid conducting body 144 may be omitted. In other embodiments, the ceramic substrate 1421 may be cylindrical or other shapes.

Figure 6:
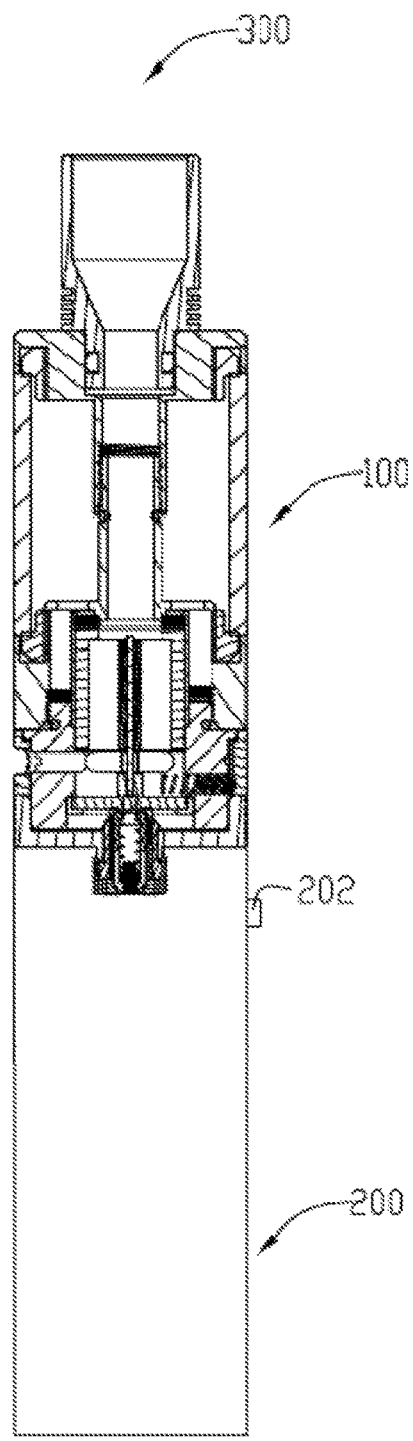
FIG. 6 is a cross-sectional view of an electronic cigarette according to a second embodiment.

Referring to FIG. 6, an electronic cigarette 300 includes an atomizer 100, and a power supply 200 detachably connected with the atomizer. The power supply 200 is configured for supplying the atomizer 100 power. The power supply 200 includes a button 202 for turning on/off the atomizer. The power supply 200 further includes a battery and a micro-controller (not shown).

Figure 7:
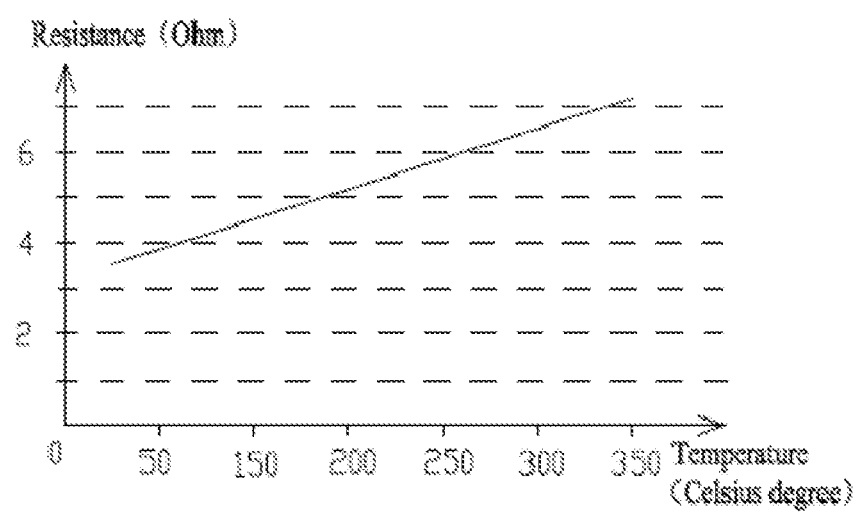
FIG. 7 is a schematic view of a chart showing a resistance temperature change of a thermistor layer.

Referring to FIGS. 1-3 and 7, when the button 202 is pressed, the heating body 142 heats the tobacco liquid in the liquid conducting body 144 to form aerosol. The user can suck the aerosol via the mouthpiece 11. As the heating part 1427 continues heating, a temperature of a surface of the ceramic substrate 1421 (i.e., an atomization temperature of the tobacco liquid) increases. A resistance of the thermistor layer 1428 will change as the temperature increases. In the present embodiment, the thermistor layer 1428 is made of an alloy of tungsten, molybdenum and manganese, a temperature coefficient of resistance is substantially constant, as seen in FIG. 7. The microcontroller of the power supply 200 can detect the atomization temperature of the tobacco liquid by detecting a current or a voltage in a circuit. When the atomization temperature is too high, the microcontroller turns off the heating element 1422 or decreases an output power of the heating element 1422. In this way, the liquid conducting body 144 is prevented from being burnt, thus improving users' experience.

In the present disclosure, the heating assembly includes a heating element and a temperature sensing element. The temperature sensing element can accurately detect the atomization temperature of the tobacco liquid, thus preventing the atomizer from dry burning. Further, it is convenient to assemble the heating assembly.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:
1. A heating assembly, comprising:
a ceramic substrate having at least one surface;
a heating element formed on the at least one surface, the heating element comprising a heating part and an electrode part, the heating part being formed on the at least one surface, the electrode part being arranged at two opposite ends of the heating part; and a temperature sensing element formed on the at least one surface, the temperature sensing element comprising a thermistor layer and an electrically connecting part, the thermistor layer being formed on the at least one surface, the electrically connecting part of the temperature sensing element connecting electrically with the thermistor layer of the temperature sensing element, and the thermistor layer being insulated from the heating part of the heating element.

2. The heating assembly according to claim 1, wherein the at least one surface comprises two opposite surfaces, and both the heating element and the temperature sensing element are formed on an identical surface.

3. The heating assembly according to claim 1, wherein the electrode part comprises a first electrode and a common electrode, the electrically connecting part comprises a second electrode, and the common electrode also serves as an electrode of the electrically connecting part.

4. The heating assembly according to claim 3, wherein the first electrode, the second electrode, and the common electrode are arranged in a line adjacent to a bottom edge of the ceramic substrate.

5. The heating assembly according to claim 1, wherein the ceramic substrate comprises two opposite surfaces, and the heating element and the temperature sensing element are formed on the two surfaces, respectively.

6. The heating assembly according to claim 1, wherein the ceramic substrate is made of porous ceramic.

7. The heating assembly according to claim 1, wherein the heating part and the thermistor layer are made of a material consisting of tungsten, molybdenum, manganese and any combination thereof.

8. The heating assembly according to claim 1, wherein a resistivity of the thermistor layer is larger than that of the heating part.

9. An atomizer, comprising:
a housing;
a mouthpiece defining a first air outlet;
a ventilation part;
a liquid chamber configured for storing tobacco liquid;
a holder;
an atomizing cover;
a first air inlet;
an atomizing chamber defined by the atomizing cover and the holder, the atomizing chamber being in communication with the first air inlet and the first air outlet; and
a heating assembly according to claim 1, the heating assembly being arranged in the atomizing chamber, the heating assembly being configured for heating tobacco liquid to form aerosol.

10. The atomizer according to claim 9, further comprising at least one liquid conducting body, wherein the at least one liquid conducting body contacts with the at least one surface, and the at least one liquid conducting body covers the heating element and the temperature sensing element.

11. The atomizer according to claim 9, wherein the liquid chamber is cooperatively defined by the housing, the mouthpiece, and the ventilation part.

12. The atomizer according to claim 9, wherein the holder defines a slot in one side, and the electrically connecting part and the electrode part are electrically engaged in the slot.

13. An electronic cigarette, comprising:
an atomizer according to claim 9; and
a power supply configured for supplying the atomizer power.

* * * * *